(12) United States Patent
Nakai et al.

(10) Patent No.: US 7,063,056 B2
(45) Date of Patent: Jun. 20, 2006

(54) VALVE TIMING CONTROL APPARATUS FOR ENGINE

(75) Inventors: Hideo Nakai, Kusatsu (JP); Katsuhiko Miyamoto, Kyoto (JP); Yoshiyuki Hoshiba, Kyoto (JP); Katsuyuki Maeda, Otsu (JP); Seiji Shiota, Kyoto (JP)

(73) Assignees: Mitsubishi Jidosha Kogyo Kabushiki Kaisha, Tokyo (JP); Mitsubishi Jidosha Engineering Kabushiki Kaisha, Okazaki (JP)

( * ) Notice: Subject to any disclaimer, the term of this patent is extended or adjusted under 35 U.S.C. 154(b) by 0 days.

(21) Appl. No.: 10/852,220

(22) Filed: May 25, 2004

(65) Prior Publication Data

US 2005/0263118 A1    Dec. 1, 2005

(51) Int. Cl.
F01L 1/34 (2006.01)

(52) U.S. Cl. ............... 123/90.15; 123/90.16; 123/90.31; 123/90.17; 60/284

(58) Field of Classification Search .. 123/90.11–90.18, 123/90.27, 90.31; 60/284, 285
See application file for complete search history.

(56) References Cited

U.S. PATENT DOCUMENTS

| | | | | |
|---|---|---|---|---|
| 5,398,502 A | * | 3/1995 | Watanabe | 60/284 |
| 5,644,073 A | * | 7/1997 | Matsuno et al. | 73/118.1 |
| 5,848,529 A | * | 12/1998 | Katoh et al. | 60/274 |
| 6,109,225 A | * | 8/2000 | Ogita et al. | 123/90.15 |
| 6,266,957 B1 | * | 7/2001 | Nozawa et al. | 60/284 |
| 6,360,531 B1 | * | 3/2002 | Wiemero et al. | 60/284 |
| 6,484,676 B1 | * | 11/2002 | Shimizu et al. | 123/90.15 |
| 6,622,689 B1 | * | 9/2003 | Hasegawa et al. | 123/294 |
| 6,637,386 B1 | * | 10/2003 | Murata et al. | 123/90.15 |

FOREIGN PATENT DOCUMENTS

JP         10-176557 A       6/1998

* cited by examiner

*Primary Examiner*—Thomas Denion
*Assistant Examiner*—Kyle M. Riddle
(74) *Attorney, Agent, or Firm*—Birch, Stewart, Kolasch & Birch, LLP

(57) ABSTRACT

There is provided a valve timing control apparatus for an engine, which comprises a variable valve mechanism capable of varying at least one of an opening timing of intake valves and a closing timing of exhaust valves in an engine, an elapsed time detecting device that detects a time period elapsed after cold-starting of the engine, and a timing control device that controls the variable valve mechanism. The timing control device provides advance angle control such that the opening timing of the intake valves and/or the closing timing of the exhaust valves is advanced to be earlier than an exhaust top dead center until the elapsed time period detected by the elapsed time detecting device has reached a predetermined time period.

11 Claims, 4 Drawing Sheets

VALVE TIMING CONTROL APPARATUS FOR ENGINE

BACKGROUND OF THE INVENTION

1. Field of the Invention

The present invention relates to a valve timing control apparatus for an engine, and more particularly to a valve timing control apparatus for an engine to realize a stable engine revolution irrespective of fuel type when the engine is cold.

2. Description of the Related Art

In general, the opening/closing timing of intake valves and exhaust valves has a great influence on engine power, and there may be a case where a valve overlap range is provided by changing settings as to the opening/closing timing. In the valve overlap range, the valve overlap amount, which is set such that the operating angles of the intake valves and the exhaust valves are overlapped, improves intake efficiency because exhaust gas can be pushed out toward an exhaust passage due to inertia of intake air when the engine is revolving at a high speed.

The valve overlap range needs to be changed according to requirements as the engine speed is changed from a low speed to a high speed. Specifically, when a MPI (multi-port injection) type engine, in which fuel is injected via an intake port in the exhaust stroke of a piston, is used, fuel adheres to the wall of the intake port resulting in tardy acceleration at cold-start of the engine, for example. Therefore, the valve overlap range needs to be changed according to the operative condition of the engine. Accordingly, a valve timing control apparatus has been disclosed which changes the overlap where both intake valves and exhaust valves are opened according to the operative condition of an engine (Japanese Laid-Open Patent Publication (Kokai) No. 10-176557, for example)

The valve timing control device reduces internal EGR by reducing the overlap amount when the engine is cold. This prevents tardy acceleration, and reduces internal EGR, thus ensuring combustion stability.

Further, the valve timing control device determines carburetion characteristics of fuel being used for the engine. When it is determined that light fuel with favorable carburetion characteristics is being used, the overlap amount is increased to be larger than in the case where heavy fuel with unfavorable carburetion characteristics is used. Therefore, even when the engine is cold, fuel is unlikely to adhere to the wall of an intake port or the like depending on the fuel type.

Further, if combustion is unstable due to a variation in air-fuel ratio, e.g., at a cold-start of the engine, the overlap amount is reduced close to zero such that the closing timing of the exhaust valves and the opening timing of the intake valves correspond to each other at an exhaust top dead center (TDC) of a piston. This reduces internal EGR to ensure combustion stability.

By the way, reducing the overlap amount close to zero at a cold-start of the engine reduces internal EGR as described above, and hence combustion stability can be ensured. In this case, however, the amount of exhaust gas blown back toward the intake port is decreased, and the percentage of exhaust gas which has been emitted once and taken again into cylinders is decreased and may cause some problems. Specifically, reducing internal EGR raises the problem that fuel carburetion is deteriorated since fuel atomization cannot be accelerated when the engine is cold-started. Particularly in the case where heavy fuel with unfavorable carburetion characteristics is used, the air-fuel ratio becomes excessively lean, causing unstable engine revolution and engine stall.

To address this problem, it can be envisaged that the air-fuel ratio is made richer by increasing the amount of fuel, but this raises the problem that unburned fuel (HC) is increased at the cold-start of the engine and deteriorates the exhaust gas performance.

Therefore, it is necessary to take some measures against unstable engine revolution when the engine is cold-started. According to the above described prior art, however, although the overlap amount is set to be small when the engine is cold, this setting of the overlap amount is made after carburetion characteristics of fuel are determined. Specifically, although the overlap amount can be changed according to carburetion characteristics of fuel, special consideration is not given to the overlap amount when the engine is cold-started, causing unstable engine revolution and engine stall depending on the fuel type.

SUMMARY OF THE INVENTION

Therefore, the present invention provides a valve timing control apparatus for an engine, which realizes stable engine revolution irrespective of fuel type when the engine is cold.

To attain the above object, there is provided a valve timing control apparatus for an engine, comprising a variable valve mechanism capable of varying at least one of an opening timing of intake valves and a closing timing of exhaust valves in the engine, an elapsed time detecting device that detects a time period elapsed after cold-starting of the engine, and a timing control device that controls the variable valve mechanism, and wherein the timing control device provides advance angle control, such that at least one of the opening timing of the intake valves and the closing timing of the exhaust valves is advanced to be earlier than an exhaust top dead center until the elapsed time period detected by the elapsed time detecting device has reached a predetermined time period.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE INVENTION

The present invention will now be described in detail with reference to the drawings showing an embodiment thereof.

Figure 1:
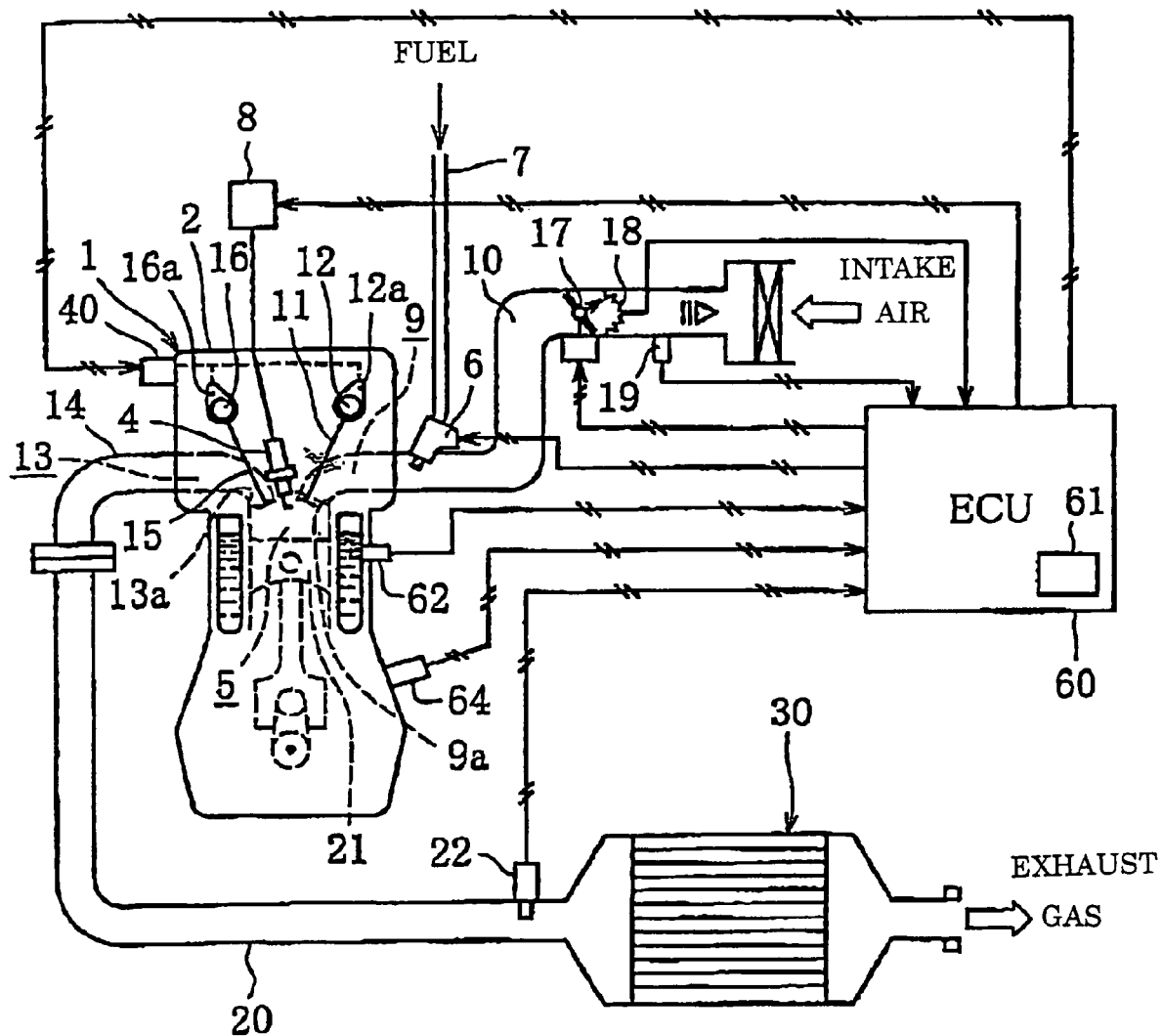
FIG. 1 is a diagram showing the arrangement of an engine system according to an embodiment of the present invention.

FIG. 1 is a diagram showing the arrangement of an engine system applied to a valve timing control apparatus for an engine according to an embodiment of the present invention.

As an internal combustion engine (hereinafter referred to as "engine") 1 the valve timing control apparatus according to the present embodiment, a multi-port injection type engine (MPI type engine), in which fuel can be selectively injected via an intake port 9, is employed, for example.

As shown in FIG. 1, at a cylinder head 2 of each cylinder in the engine 1, an intake port 9 is formed in a substantially horizontal direction. An intake valve 11 which causes each intake port 9 to come into communication with or to be shut off from a combustion chamber 5 is provided on the combustion chamber 5 side of each intake port 9. The intake valve 11 causes an intake port 9a to open and close according to the movement of a cam 12a of a camshaft 12 rotating in response to the revolution of the engine 1. An electromagnetic injector 6 which injects fuel into each cylinder is attached to each intake port 9. A fuel supply device, not shown, including a fuel tank is connected to the injector 6 via a fuel pipe 7. The injector 6 injects fuel toward the combustion chamber 5 in the exhaust stroke of a piston 21.

An end of an intake manifold 10 is connected to each intake port 9. An electromagnetic throttle valve 17 which adjusts the quantity of intake air is disposed in the intake manifold 10. A throttle position sensor (TPS) 18 which detects the throttle valve opening is disposed in the vicinity of the throttle valve 17. Further, a Karman's vortex type air flow sensor 19 which detects the quantity of intake air is disposed upstream of the throttle valve 17 in the intake manifold 10.

An ignition plug 4 is attached to the cylinder head 2 of each cylinder, and an ignition coil 8 which outputs a high voltage is connected to the ignition plug 4, so that an air-fuel mixture of flesh air from the intake manifold 10 and fuel from the injector 6 is spark-ignited in the combustion chamber 5.

Further, at the cylinder head 2 of each cylinder in the engine 1, an exhaust port 13 is formed in a substantially horizontal direction. An exhaust valve 15 which causes each exhaust port 13 to come into communication with or to be shut off from a combustion chamber 5 is provided on the combustion chamber 5 side of each exhaust port 13. The exhaust valve 13 causes an exhaust port 13a to open and close according to the movement of a cam 16a of a camshaft 16 rotating in response to the revolution of the engine 1.

One end of an exhaust manifold 14 is connected to each exhaust port 13. An exhaust pipe 20 is connected to the other end of the exhaust manifold 14, while a three-way catalytic converter 30 capable of efficiently purifying HC, CO, and NOX at an air-fuel ratio approximate to a stoichiometric air-fuel ratio is disposed in the exhaust pipe 20. Further, $O_2$ sensor 22 which detects the air-fuel ratio of exhaust gas as well as the concentration of oxygen in exhaust gas is disposed just upstream of the three-way catalytic converter 30 in the exhaust pipe 20.

The cylinder head 2 is provided with a variable valve mechanism 40 capable of varying the opening/closing timing of an intake valve 11 and an exhaust valve 15 by shifting the phase of the cam 12a and the cam 16a to an advanced angle side or a retarded angle side. For example, a pendulum variable valve timing mechanism which swings the camshaft 12, 16 is employed as the variable valve mechanism 40. It should be noted that the pendulum variable valve timing mechanism is known, and hence detailed description thereof is omitted.

An ECU (Electronic Control Unit) 60 is provided with an input/output device, storage device, central processing unit (CPU), and so forth, and controls the overall operation of the engine 1.

Connected to an input of the ECU 60 are a variety of sensors such as a water temperature sensor 62 which detects the cooling water temperature of the engine 1, and a crank angle sensor 64 which detects the crank angle of the engine 1, as well as the above described TPS 18, air flow sensor 19, and $O_2$ sensor 22, and information detected by these sensors is input to the ECU 60. The engine speed (actual Ne) of the engine 1 is detected based on the result of detection by the crank angle sensor 64. Further, the target engine speed (target Ne) of the engine 1 according to predetermined carburetion characteristics of fuel is set in the storage device of the ECU 60; when light fuel with favorable carburetion characteristics is used, the quantity of fuel and the quantity of air are set such that the actual Ne is equal to or greater than the target Ne.

On the other hand, a variety of output devices such as the above described injector 6, ignition coil 8, throttle valve 17, and variable valve mechanism 40 are connected to an output of the ECU 60. Signals indicative of the fuel injection quantity, fuel injection timing, ignition timing, and throttle valve opening based on detection information supplied from the variety of sensors are output to the injector 6, ignition coil 8, and throttle valve 17. As a result, a proper quantity of fuel can be injected from the injector 6 at a proper timing, spark ignition can be performed a proper timing by the ignition plug 4, and the throttle valve opening can be controlled to a proper opening. Further, a proper valve timing instruction can be given to the variable valve mechanism 40.

Particularly, in the valve timing control apparatus according to the present invention, the ECU 60 is provided with a timing controller (timing control device) 61 which controls the variable valve mechanism 40.

The timing controller 61 includes an elapsed time detecting device which detects the time period elapsed after a cold-start of the engine 1, an actual engine speed detecting device which detects the engine speed (actual Ne) of the engine 1, a target engine speed setting device which sets the target engine speed (target Ne) of the engine 1 according to predetermined carburetion characteristics of fuel used in the engine 1, and a cold-start target timing setting device which sets the target VVT phase in cold state of the engine 1 based on output signals from the elapsed time detecting device, actual engine speed detecting device, and target engine speed setting device.

The cold-start target timing setting device sets the target VVT phase so that the opening timing of the intake valve 11 lies at a top dead center (exhaust top dead center) TDC in the exhaust stroke of the piston 21 and the closing timing EC of the exhaust valve 15 is advanced to be earlier than the exhaust top dead center TDC until the elapsed time period detected by the elapsed time detecting device reaches a predetermined time period (first predetermined time period).

As described above, first, the cold-start target timing setting device sets the closing timing EC of the exhaust valve 15 earlier than the exhaust top dead center TDC, irrespective of whether light fuel or heavy fuel is used, until the first predetermined time period has elapsed from the cold-starting. Therefore, the flow of residual gas blown back with fresh air into the combustion chamber 5 accelerates atomization of fuel, thus stabilizing engine revolution.

Next, the cold-start target timing setting device sets the target VVT phase according to a difference in engine speed between different fuel types during first idling after the lapse of the first predetermined time period. Specifically, if the actual Ne is equal to or greater than the target Ne after the lapse of the first predetermined time period, it is determined that carburetion characteristics of fuel being used are favorable, and the variable valve mechanism 40 is controlled to retard the closing timing EC of the exhaust valve 15 to the exhaust top dead center TDC and is inhibited from providing advance angle control to set the closing timing EC of the exhaust valve 15 earlier than the exhaust top dead center TDC. If the actual Ne is smaller than the target Ne after the first predetermined time period has elapsed, it is determined that carburetion characteristics of fuel being used are not favorable, and the variable valve mechanism 40 is controlled to continue the advance angle control to set the closing timing EC of the exhaust valve 15 earlier than the exhaust top dead center TDC. It should be noted that the exhaust top dead center TDC is a timing in which the piston 21 is closest to the cylinder head 2 in the exhaust stroke, and the first idling corresponds to a case where an N range is set as the shift position of a transmission.

In this way, the cold-start target timing setting device determines carburetion characteristics of fuel being used by comparing the actual Ne and the target Ne with each other during the first idling after the first predetermined time period has elapsed, and sets the closing timing EC of the exhaust valve 14 according to the determination result to prohibit or accelerate atomization of fuel, thereby preventing emission of unburned fuel (HC) or stabilizing engine revolution.

Figure 2:
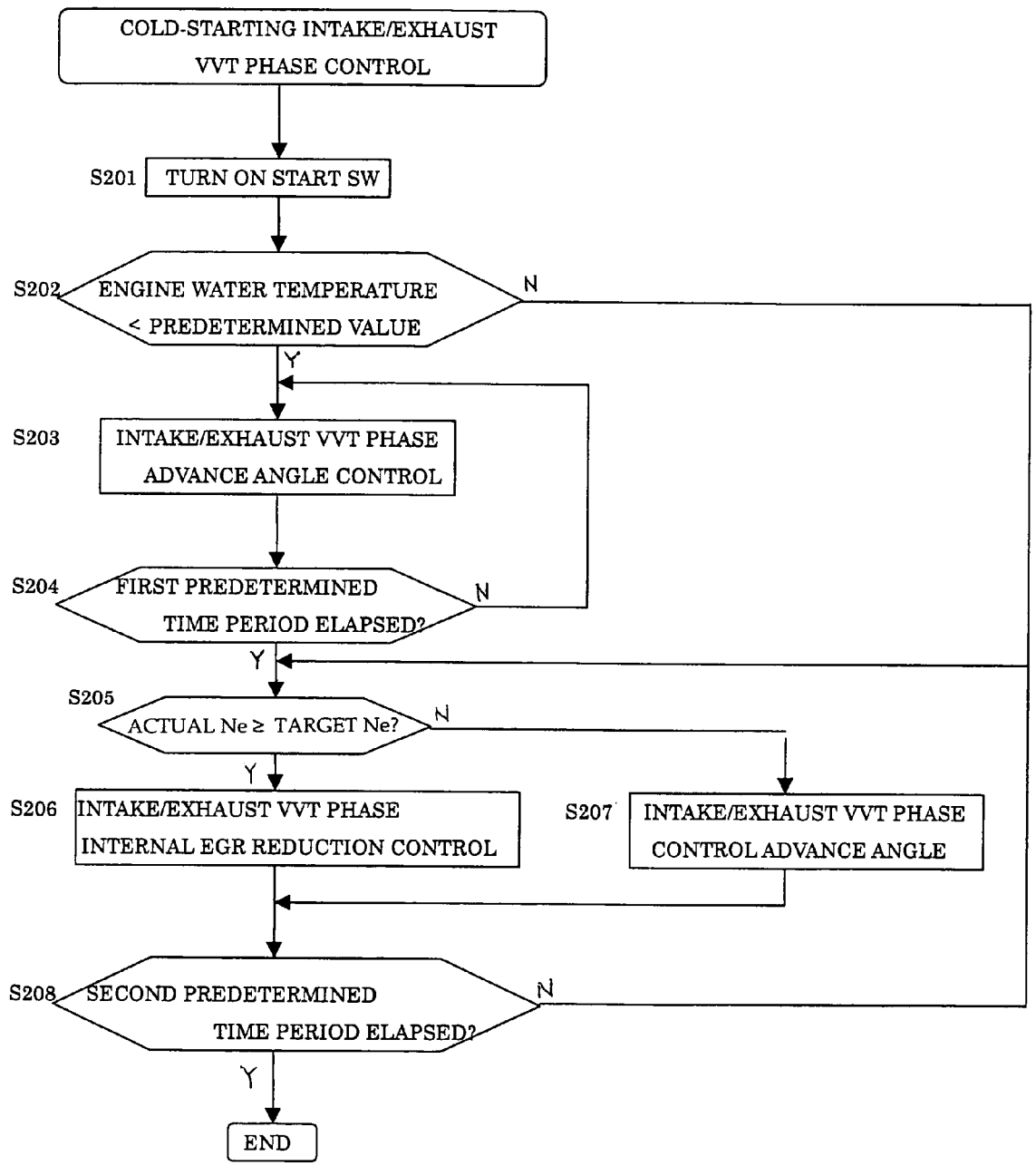
FIG. 2 is a flow chart showing a cold-start control routine carried out by a valve timing control apparatus shown in FIG. 1.

FIG. 2 is a flow chart showing a cold-start intake/exhaust VVT phase control routine carried out by the above described valve timing control apparatus according to the present invention. A description will now be given of a procedure for controlling the VVT phase with reference to the flow chart of FIG. 2.

In Step S201 in FIG. 2, an ignition SW is turned on, and in Step S202, whether the cooling water temperature is lower than a predetermined temperature, i.e., whether the engine 1 is being cold-started or not is determined according to an output signal from the water temperature sensor 62. If it is determined in Step S202 that the cooling water temperature is lower than a predetermined temperature, i.e., the determination result is positive (YES), the process proceeds to Step S203 wherein the cold-start target timing setting device sets the target VVT phase for the closing timing EC of the exhaust valve 15 earlier than the exhaust top dead center TDC, and the process proceeds to Step S204. On the other hand, if it is determined in Step S202 that the cooling water temperature is equal to or higher than the predetermined temperature, the process proceeds to Step S205.

In step S204, the elapsed time detecting device determines whether a first predetermined time period, as a period of time from the cold-starting of the engine 1 to the start of the first idling, has elapsed or not. If it is determined in step S204 that the first predetermined time period has elapsed, i.e., the determination result is positive (YES), the process proceeds to Step S205. On the other hand, if it is determined in step S204 that the first predetermined time period has not elapsed, the process proceeds to step S203 to continue providing advance angle control for the closing timing EC of the exhaust valve 15.

In Step S205, the cold-start target timing setting device compares the actual Ne detected by the actual engine speed detecting device and the target Ne set by the target engine speed setting device to determine whether or not the actual Ne is equal to or greater than the target Ne. If it is determined that the actual real Ne is equal to or greater than the target Ne and fuel being used has favorable carburetion characteristics, i.e., the determination result is positive (YES), the process proceeds to Step S206 wherein the target VVT phase for the closing timing EC of the exhaust valve 15 is set on the advanced angle side so that the closing timing of the exhaust valve 15 can be retarded from timing earlier than the exhaust top dead center TDC to the exhaust top dead center TDC. Therefore, internal EGR is reduced.

On the other hand, if it is determined in Step S205 that the actual Ne is smaller than the target Ne and hence fuel being used does not have favorable carburetion characteristics, the process proceeds to Step S207 with the target VVT phase for the closing timing EC of the exhaust valve 15 being set on a more advanced angle side as compared with the exhaust top dead center TDC to continue providing advance angle control for the closing timing EC of the exhaust valve 15. It should be noted that an advance angle limit value is provided for the target VVT phase for the reason that an excessive increase in internal EGR may cause engine stall although internal EGR accelerates atomization of fuel.

In Step S208, the elapsed time detecting device determines whether a second predetermined time period, indicative of the end of the first idling and ensures sufficient combustion stability even if heavy fuel is being used, has elapsed or not. If it is determined that the second predetermined time period has elapsed, i.e., the determination result is positive (YES), the routine is brought to an end to prepare for starting. On the other hand, if it is determined that the second predetermined time period has not elapsed, the process returns to step S205 to continuously provide control for the closing timing EC of the exhaust timing 15 during the first idling.

Figure 3A:
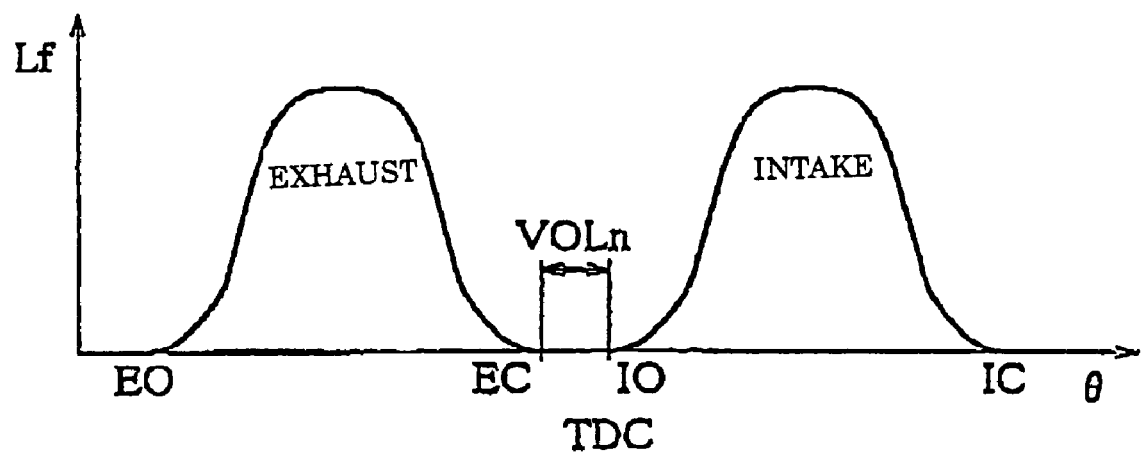
FIGS. 3(a) and 3(b) are timing charts showing a cold-start control process carried out by the valve timing control apparatus in shown FIG. 1.
Figure 3B:
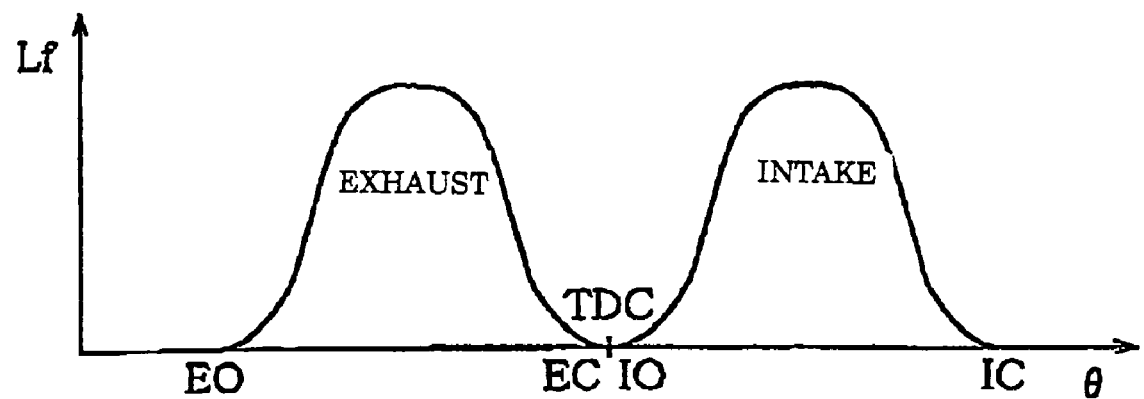

FIGS. 3(a) and 3(b) are timing charts showing a cold-starting control (Steps S203, S206, and S207) provided by the above-described valve timing control apparatus. In FIGS. 3(a) and 3(b), the abscissa indicates the valve lift Lf, and the ordinate indicates the crank angle θ. EO and EC indicate the opening timing and the closing timing, respectively, of the exhaust valve 15, and IO and IC indicate the opening timing and the closing timing, respectively, of the intake valve 11.

As shown in FIG. 3(a), as in Step S203 or S207, the opening timing IO of the intake valve 11 is set to be immediately following the exhaust top dead center TDC and the closing timing EC of the exhaust valve 15 is advanced to be earlier than the exhaust top dead center TDC until the first predetermined time period as a period of time indicative of the start of the first idling has elapsed or until the second predetermined time period indicative of the end of the first idling has elapsed. A minus overlap VOLn is set between the opening closing timing IO of the intake valve 11 and the closing timing EC of the exhaust valve 15, and the combustion chamber 5 is sealed.

Thus, if the target VVT phase is set such that the closing timing EC of the exhaust valve 15 is advanced to be earlier than the exhaust top dead center TDC, residual gas is compressed and increased in temperature due to upward movement of the piston 21, and is once blown out from the combustion chamber 5 via the intake port 9a with opening of the intake valve 11. The residual gas, however, is returned with fuel injected from the intake port 9 and fresh air into the combustion chamber 5 due to sufficient negative pressure. This accelerates mixing of fuel and air and atomization of fuel.

As shown in FIG. 3(b), as in Step S206, the opening timing IO of the intake valve 11 is set to be immediately following the exhaust top dead center TDC and the closing timing EC of the exhaust valve 15 is retarded to the exhaust top dead center TDC until the first predetermined time period has elapsed and the second predetermined time period indicative of the end of the first idling in the case where light fuel is used has elapsed, as well as during cold-starting of the engine 1. Therefore, the above-mentioned overlap VOLn is eliminated. Namely, the closing timing EC of the exhaust valve 15 is made to correspond to the opening timing IO of the intake valve 11, and hence the overlap amount is reduced to zero.

Thus, if the target VVT phase is set such that the closing timing EC of the exhaust valve 15 is retarded to the exhaust top dead center TDC, internal EGR is reduced, so that excessive atomization of fuel can be prevented even when light fuel with favorable carburetion characteristics is used.

As described above, according to the present invention, the valve timing control apparatus for the engine 1, including the timing controller 61 which controls the opening timing IO of the intake valve 11 of the engine 1 and the closing timing of the EC of the exhaust valve 15, is provided with the elapsed time detecting device which detects the time period elapsed after cold-starting of the engine 1, the actual engine speed detecting device which detects the actual Ne of the engine 1, the target engine speed setting device which sets the target Ne of the engine 1 according to predetermined carburetion characteristics of fuel being used in the engine 1, and the cold-start target timing setting device which sets the target VVT phase which compares the actual Ne and the target Ne to set the target valve timing when the engine 1 cold. The cold-start target timing setting device sets the closing timing EC of the exhaust valve 15 to be earlier than the exhaust top dead center TDC until the elapsed time period detected by the elapsed time detecting device has reached the predetermined time period. Therefore, gas which has been compressed and increased in temperature is quickly taken again into the combustion chamber 5, making it possible to accelerate atomization of fuel whatever fuel type is used, and to ensure stable engine revolution immediately after cold-starting of the engine 1.

Further, the cold-start target timing device determines that carburetion characteristics are favorable when the actual Ne is equal to or greater than the target Ne after the elapsed time period detected by the elapsed time detecting device has reached the first predetermined time period, and prohibits the opening timing EC of the exhaust valve 15 from being advanced and reduces the valve overlap around the exhaust top dead center TDC to zero. This reduces internal EGR to stabilize combustion. In other words, if light fuel or the like with favorable carburetion characteristics is used, fuel carburetion is excessively accelerated if the closing timing EC of the exhaust valve 15 is continuously controlled to be advanced for a long period of time, and then the air-fuel ratio becomes excessively lean, making engine revolution unstable. To prevent this, it can be envisaged that fuel is increased, but prohibiting the above described advance angle can prevent the air-fuel ratio from becoming excessively lean. Therefore, unburned fuel (HC) can be reduced without increasing fuel.

Further, the cold-start target timing setting device determines that carburetion characteristics are not favorable when the actual Ne is smaller than the target Ne after the elapsed time period detected by the elapsed time detecting device has reached the first predetermined time period, so that the advance angle control for the closing timing EC of the exhaust valve 15 is continued. Therefore, if heavy fuel or the like with unfavorable carburetion characteristics is used, atomization of fuel is accelerated even during the first idling to continuously ensure stable engine revolution.

It should be understood that the present invention is not limited to the embodiment described above, but various variations of the above-described embodiment may be possible without departing from the spirits of the present invention.

For example, although in the above described embodiment, only the closing timing EC of the exhaust valve 15 is advanced to be earlier than the exhaust top dead center TDC, the present invention is not limited to this, but at least one of the opening timing IO of the intake valve 11 and the closing timing EC of the exhaust valve 15 may be advanced to be earlier than the exhaust top dead center TDC.

Figure 4A:
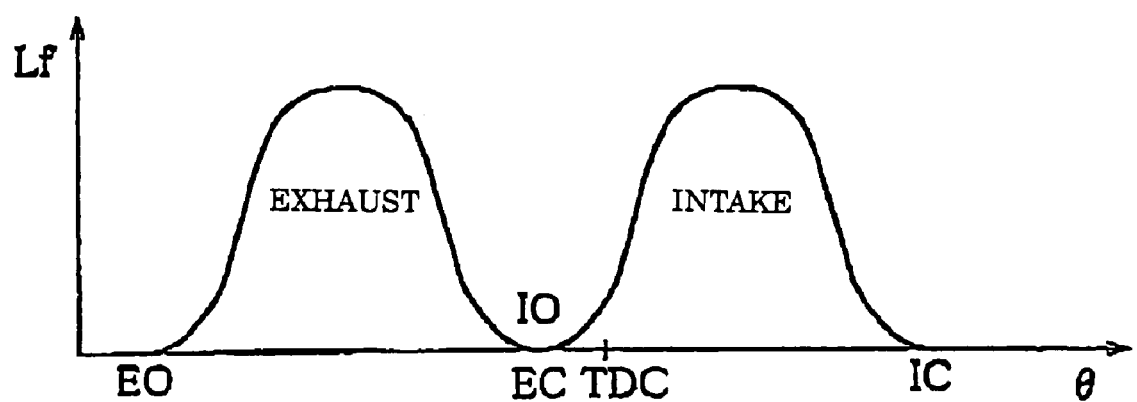
FIGS. 4(a) and 4(b) are timing charts showing another cold-start control process carried out by the valve timing control apparatus.
Figure 4B:
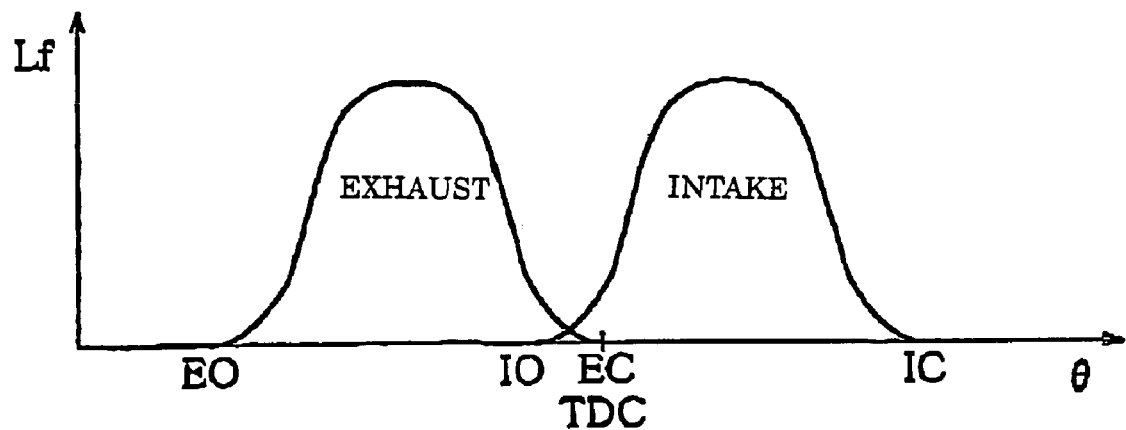

FIGS. 4(a) and 4(b) are timing charts showing another cold-starting control provided by the valve timing control apparatus. Specifically, FIG. 4(a) shows a case where the opening timing IO of the intake valve 11 as well as the closing timing EC of the exhaust valve 15 is advanced, while FIG. 4(b) shows a case where only the opening timing IO of the intake valve 11 is advanced.

If both the closing timing EC of the exhaust valve 15 and the opening timing IO of the intake valve 11 are advanced to be earlier than the exhaust top dead center TDC as shown in FIG. 4(a), residual gas in each cylinder is more quickly taken again into the combustion chamber 5 so that a longer carburetion time can be ensured as compared with the case where only the closing timing EC of the exhaust valve 15 is advanced to be earlier than the exhaust to top dead center TDC. Also, if the opening timing IO of the intake valve 11 is advanced to be earlier than the exhaust top dead center TDC while the closing timing EC of the exhaust valve EC is set at the exhaust top dead center TDC as shown in FIG. 4(b), a longer carburetion time can be ensured.

Further, in the above described variation in which at least one of the opening timing IO of the intake valve 11 and the closing timing EC of the exhaust valve 15 is advanced to be earlier than the exhaust top dead center TDC, the opening timing IO of the intake valve 11 is set to be immediately following the exhaust top dead center TDC and the closing timing EC of the exhaust valve 15 is advanced to be earlier than the exhaust top dead center as shown in FIG. 3(a) at start of the engine 1, and thereafter, the opening timing of the intake valve 11 is advanced to be earlier than the exhaust top dead center TDC with the closing timing EC of the exhaust valve 15 being unchanged. In this case, a long carburetion time can be ensured as in the above-described embodiment.

Further, although in the above described embodiment, the MPI type engine is used, the present invention is not limited to this, but the valve timing control apparatus may be applied to a cylinder injection type engine, and in this case, engine revolution can be stabilized at cold-start of the engine 1 irrespective of fuel type as in the above described embodiment.

The invention claimed is:

1. A valve timing control apparatus for an engine, comprising:

a variable valve mechanism capable of varying at least one of an opening timing of intake valves and a closing timing of exhaust valves in the engine, such that valve timing is selectively switched between a first timing in which a minus overlap exists between the closing timing of the exhaust valves and the opening timing of the intake valves prior to an exhaust top dead center, and a second timing in which no overlap exists between the closing timing of the exhaust valves and the opening timing of the intake valves;

a first elapsed time detecting device that detects a first time period after a cold-starting of the engine;

an actual engine speed detecting device that detects an actual engine speed of the engine;

a target engine speed setting device that sets a target engine speed of the engine determined based on carburetion characteristics of fuel being used for the engine;

a comparator device that compares the set target speed of the engine with the detected actual engine speed; and a timing control device that controls said variable valve mechanism, said timing control device switches, for the first period of time, the valve timing to the first timing, and maintaining, after the first period of time, the valve timing at the first timing when the detected actual engine speed is less than the set target speed.

2. A valve timing control apparatus for an engine according to claim 1, wherein said timing control device provides control such that only the closing timing of the exhaust valves is advanced to be earlier than the exhaust top dead center until said first time period has elapsed.

3. A valve timing control apparatus for an engine according to claim 1, wherein said timing control device provides control such that the closing timing of the exhaust valves and the opening timing of the intake valves are advanced to be earlier than the exhaust top dead center until said first time period elapses.

4. A valve timing control apparatus for an engine according to claim 1, wherein said timing control device provides control such that only the opening timing of the intake valves is advanced to be earlier than the exhaust top dead center until said first time period elapses.

5. A valve timing control apparatus for an engine according to claim 1, wherein said timing control device advances only the closing timing of the exhaust valves to be earlier than the exhaust top dead center, and thereafter advances only the opening timing of the intake valves to be earlier than the exhaust top dead center until said first time period elapses.

6. A valve timing control apparatus for an engine according to claim 1, wherein, said timing control device switches the valve timing to the second timing after the first period of time operation when the set actual engine speed is equal to or higher than the set target speed (S206).

7. A valve timing control apparatus for an engine according to claim 6, further comprising:

a second elapsed time detecting device that detects a second time period, wherein said timing control device controls said variable valve mechanism based on a comparison result by said comparator device until the second period of time elapses.

8. A method of controlling a valve timing of an engine, comprising:

detecting that a first time period has elapsed after a cold-starting of the engine;

advancing at least one of an opening timing of intake valves and a closing timing of exhaust valves to be earlier than an exhaust top dead center after detecting that the first time period has elapsed, such that valve timing is selectively switched between a first timing in which a minus overlap exists between the closing timing of the exhaust valves and the opening timing of the intake valves prior to an exhaust top dead center, and a second timing in which no overlap exists between the closing timing of the exhaust valves and the opening timing of the intake valves;

detecting an actual engine speed of the engine;

setting a target engine speed of the engine determined based on carburetion characteristics of fuel being used for the engine;

comparing the set target speed of the engine with the detected actual engine speed; and switching, after the first time period, an advance angle to the first timing when the detected actual engine speed is less than the set target speed.

9. The method according to claim 8, further comprising:

switching to the second timing after the first period of time when the detected actual engine speed is equal to or higher than the set target engine speed.

10. The method according to claim 9, further comprising:

repeating said actual engine speed detecting step, said comparing step, said step of switching after the first time period, and said switching to the second timing step for a second time period.

11. A valve timing control apparatus for an engine, comprising:

a variable valve mechanism that varies at least one of an opening timing of intake valves and a closing timing of exhaust valves in the engine, such that valve timing is selectively switched between a first timing in which a minus overlap exists between the closing timing of the exhaust valves and the opening timing of the intake valves prior to an exhaust top dead an actual engine speed detecting device that detects an actual engine speed of the engine when the time period has elapsed;

a target engine speed setting device that sets a target engine speed of the engine based on carburetion characteristics of fuel being used for the engine;

means for comparing the detected actual engine speed with the set target engine speed, after the predetermined time period has elapsed; and a timing control device that switches the valve timing to the first timing for the predetermined time period, and, after the predetermined time period, maintains the valve timing at the first timing when the detected actual engine speed is lower than the target engine speed, and switches the valve timing to the second timing when the detected actual engine speed is equal to or greater than the target engine speed.

* * * * *